United States Patent [19]
Segawa

[11] Patent Number: 5,612,145
[45] Date of Patent: Mar. 18, 1997

[54] PERPENDICULAR MAGNETIC MEDIUM AND MANUFACTURING METHOD FOR THE MEDIUM

[75] Inventor: Masaru Segawa, Yokohama, Japan

[73] Assignee: Victor Company of Japan, Ltd., Yokohama, Japan

[21] Appl. No.: 317,836

[22] Filed: Oct. 4, 1994

Related U.S. Application Data

[63] Continuation of Ser. No. 974,944, Nov. 12, 1992, abandoned.

[30] Foreign Application Priority Data

Nov. 14, 1991 [JP] Japan ................... 3-326403

[51] Int. Cl.$^6$ ............... G11B 5/66; C23C 14/00
[52] U.S. Cl. ............... 428/694 T; 428/694 SC; 428/694 LE; 428/900; 369/13; 204/192.2
[58] Field of Search ............ 428/694 T, 694 SC, 428/694 LE, 900; 369/13; 204/192.2

[56] References Cited

U.S. PATENT DOCUMENTS 4,992,095  2/1991  Nate et al. ................ 75/246

FOREIGN PATENT DOCUMENTS

| | | |
|---|---|---|
| 59-358 | 6/1984 | Japan . |
| 60-193125 | 10/1985 | Japan . |
| 61-66217 | 4/1986 | Japan . |
| 61-222104 | 10/1986 | Japan . |
| 62-1025 | 3/1987 | Japan . |
| 128606 | 3/1987 | Japan . |
| 63-84005 | 4/1988 | Japan . |
| 139738 | 6/1989 | Japan . |
| 232710 | 9/1989 | Japan . |

*Primary Examiner*—Leszek Kiliman
*Attorney, Agent, or Firm*—Michael N. Meller

[57] ABSTRACT

The present invention discloses a perpendicular magnetic recording medium which includes a non-magnetic base and a magnetic thin film made of a Nd—Fe—B alloy on the non-magnetic base. The Nd—Fe—B alloy has a composition of Nd: 2 to no more than 13 atom %, B: up to 4 atom % and Fe: the remainder. The Nd—Fe—B alloy having the above composition may additionally have at least one element among Co, Ga, Si and V as additives. The magnetic thin film is formed on the non-magnetic base by sputtering method, wherein a sputtering gas pressure is determined to be within a range 20–40 mTorr, and a sputtering temperature of said non-magnetic base is determined to be less than 100° C.

5 Claims, 5 Drawing Sheets

Relation between Hc(⊥) and Composition (Substrate Temp. ($T_{sub}$) : Room Temp.)

PERPENDICULAR MAGNETIC MEDIUM AND MANUFACTURING METHOD FOR THE MEDIUM

This is a continuation of application Ser. No. 07/974,944, filed Nov. 12, 1992 now abandoned.

BACKGROUND OF THE INVENTION

1. Field of the Invention

The present invention relates to improvements of a perpendicular magnetic recording medium used for a magnetic recording and/or a reproducing apparatus and a manufacturing method for the same, and it particularly relates to a perpendicular magnetic recording medium suitable to a high density magnetic recording.

2. Description of the Related Art

Presently, a Co—Or alloy is widely employed in a perpendicular magnetic recording medium as a magnetic thin film for magnetic recording. Such a perpendicular magnetic recording medium is constructed by forming the magnetic thin film, for instance, made of the Co—Cr alloy on one side of a non-magnetic base, using a surface treatment technique such as a sputtering method, a vacuum evaporation method or a plating method among which, however, a dry process such as the sputtering method and the vacuum evaporation method become a main current of the surface treatment technique because of a high corrosion resistance characteristic and facility in controlling dust and forming conditions of the magnetic thin film compared with a wet process such as the plating method.

In this dry process, the non-magnetic base requires a high sputtering temperature about 200° C. to obtain an acceptable Co—Cr alloy thin film having, for instance, a high coercive force Hc($\perp$) and good crystalline structure. Therefore, the non-magnetic base requires a heatproof material, for instance, such as Ni, NiP, glass, alumitc (aluminum Oxide clad material) or high heat resistance resin, which poses a problem that these materials are too expensive to use. Further, there is a drawback that the magnetic thin film obtained by the dry process has a large stiffness and a large internal stress, so that the magnetic thin film is difficult to be used together with a flexible non-magnetic base. Furthermore, there are another drawbacks that Cr used in the sputtering process as an evaporation source is harmful for the health, and Co used in the same process is very expensive.

Japanese Laid Open Patent Application No. 193125/1985 and Japanese Laid Open Patent Application No. 84005/1988 disclose an employment of a Fe—Nd alloy thin film instead of a Co—Cr alloy thin film in a perpendicular magnetic medium to eliminate the above drawbacks.

In the above prior arts, the Fe—Nd alloy thin film is formed on a non-magnetic base by the sputtering method at a sputtering temperature below 100° C., however, the Fe—Nd alloy thin film obtained has a low corrosion resistance and an amorphous structure, which poses a problem that the Fe—Nd alloy thin film is not practical because of magnetic characteristics change with a time lapse and of a low Curie point.

SUMMARY OF THE INVENTION

Accordingly, a general object of the present invention is to provide a perpendicular magnetic recording medium in which the above disadvantages have been eliminated.

A specific object of the present invention is to provide a perpendicular magnetic recording medium of which the magnetic thin film has a low internal stress and is free from the magnetic decay.

A further and specific object of the present invention is to provide a perpendicular magnetic recording medium of which the magnetic thin film has an excellent corrosion resistance and a high coercive force by using the sputtering method at a low substrate temperature for forming the magnetic thin film.

Another specific object of the present invention is to provide a perpendicular magnetic recording medium having a magnetic thin film made of a Nd—Fe—B alloy on the non-magnetic base, which magnetic thin film comprises Nd: 2 to no more than 13 atom %, B: up to 4 atom %, and Fe: the remainder. Other objects and further features of the present invention will be apparent from the following detailed description.

According to the present invention, the inventor has now discovered an optimum composition of a Nd—Fe—B alloy employed for a magnetic thin film by paying attention to the Nd—Fe—B alloy which has been put to practical use as a permanent magnet material during his engagement in researching and developing of new magnetic materials replacing the conventional Co—Cr alloy.

More particularly, the inventor studied relations between compositions and coercive forces Hc ($\perp$) of Nd—Fe—B alloy thin films at first. He composed samples of magnetic thin films made of Ne—Fe—B alloy having thickness 0.3 μm on glass substrates by the sputtering method with the glass substrate temperature kept at the room temperature, and argon (Ar) gas pressure of 10 mTorr. FIG. 1 is a graph showing relations between compositions and coercive forces Hc ($\perp$) of magnetic thin films according to the present invention, wherein a symbol "•" indicates an alloy composition obtained. According to FIG. 1, an area having the coercive force Hc ($\perp$) more than 500 Oe consists of two parts, i.e., one is a crystal area (confirmed α-Fe(110) by the X-ray analysis ) defined as Nd: 2 to no more than 13 atom %, B: up to 4 atom % and Fe: the remainder, and the other is an amorphous area defined as Nd is more than 17 atom%. The magnetic thin film made of Ne—Fe—B alloy in the amorphous area, however, can not be employed in the perpendicular magnetic medium because of magnetic decay characteristics and of a low Curie point. Therefore, the composition of the Ne—Fe—B alloy used in the present invention is only defined as the crystal area, i.e., an area where Nd: 2 to no more than 13 atom %, B: up to 4 atom % and Fe: the remainder.

Further, in the above composition of the Ne—Fe—B alloy, adding at least one of the additives V, Si, Ga and Co into the alloy is effective to increase Hkeff. ($\perp$) which signifies an index of an anisotropy magnetic field as described hereafter. Among the above additives, a sole element or a plurality of elements may be selectively used. A compound material made from more than two kinds of elements, for instance, $Co_1Ga_3$ can be also used.

As described in the foregoing, the perpendicular magnetic medium of the present invention is manufactured by forming a magnetic thin film made of the Nd—Fe—B alloy having the aforementioned composition on the non-magnetic base by the sputtering method, where the sputtering gas pressure is determined at 5–40 mToor. FIG. 2 is a graph showing relations between Ar gas pressures in the sputtering process and magnetic characteristics of the magnetic thin films obtained by using a target having the aforementioned composition. In FIG. 2, a symbol ● indicates Hc (⊥), ○ Hc(//), □ Mr (//)/Mr (⊥) which signifies an index of degree of the perpendicular alignment and Δ Ms, respectively.

FIG. 3 is a graph showing relations between substrate temperatures and magnetic characteristics with the thickness of the magnetic thin film 0.2 μm and Ar gas pressure of 20~40 mTorr, wherein the same symbols as those shown in FIG. 2 are used. It will be understood that the lower the substrate base temperature, the larger the coercive force Hc(⊥), and better Mr (//)/Mr (⊥) which signifies an index of the perpendicular alignment characteristic. Taking account of these points and employing a low temperature heatproof resin material as the substrate, the substrate temperature is determined below 100° C. Further, it should be noted that in the manufacturing method of the present invention, it is advantageous for obtaining a magnetic thin film of excellent magnetic characteristics that the heat-treatment on the magnetic thin film in the vacuum is performed after forming the magnetic thin film by the sputtering method.

Further, in the perpendicular magnetic medium of the present invention, it is able to obtain a magnetic thin film having a high coercive force Hc (⊥) independent of the thickness of the magnetic thin film. Further, it is able to obtain a magnetic thin film having an excellent magnetic characteristic either by a conventional perpendicular incident sputtering method or by an oblique sputtering method which prevents the substrate from excessive heat.

DETAILED DESCRIPTION OF THE PREFERRED EMBODIMENT

Figure 1:
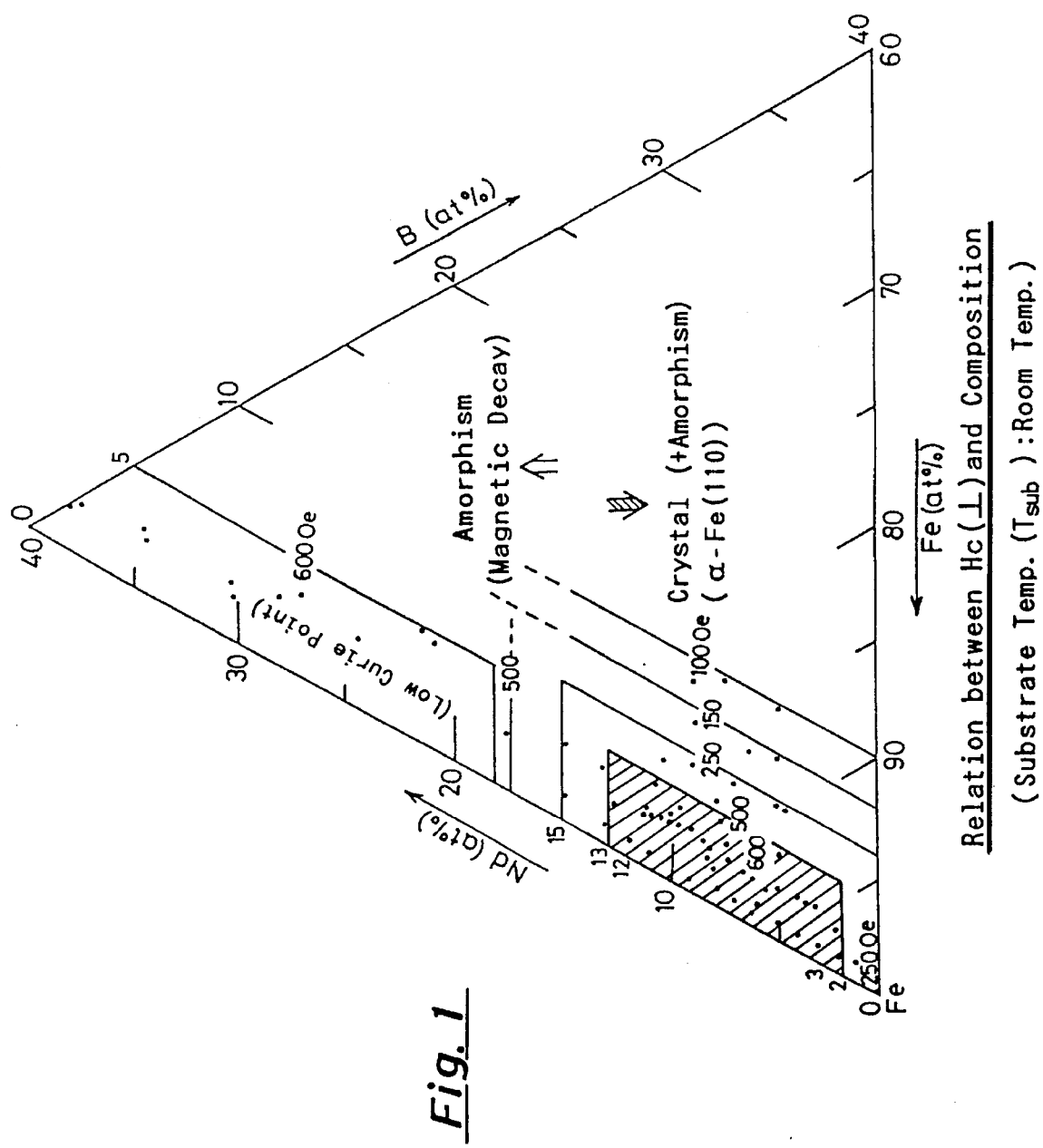
FIG. 1 is a graph showing a relation between the composition and the coercive force Hc (⊥) of a magnetic thin film according to the present invention.
Figure 2:
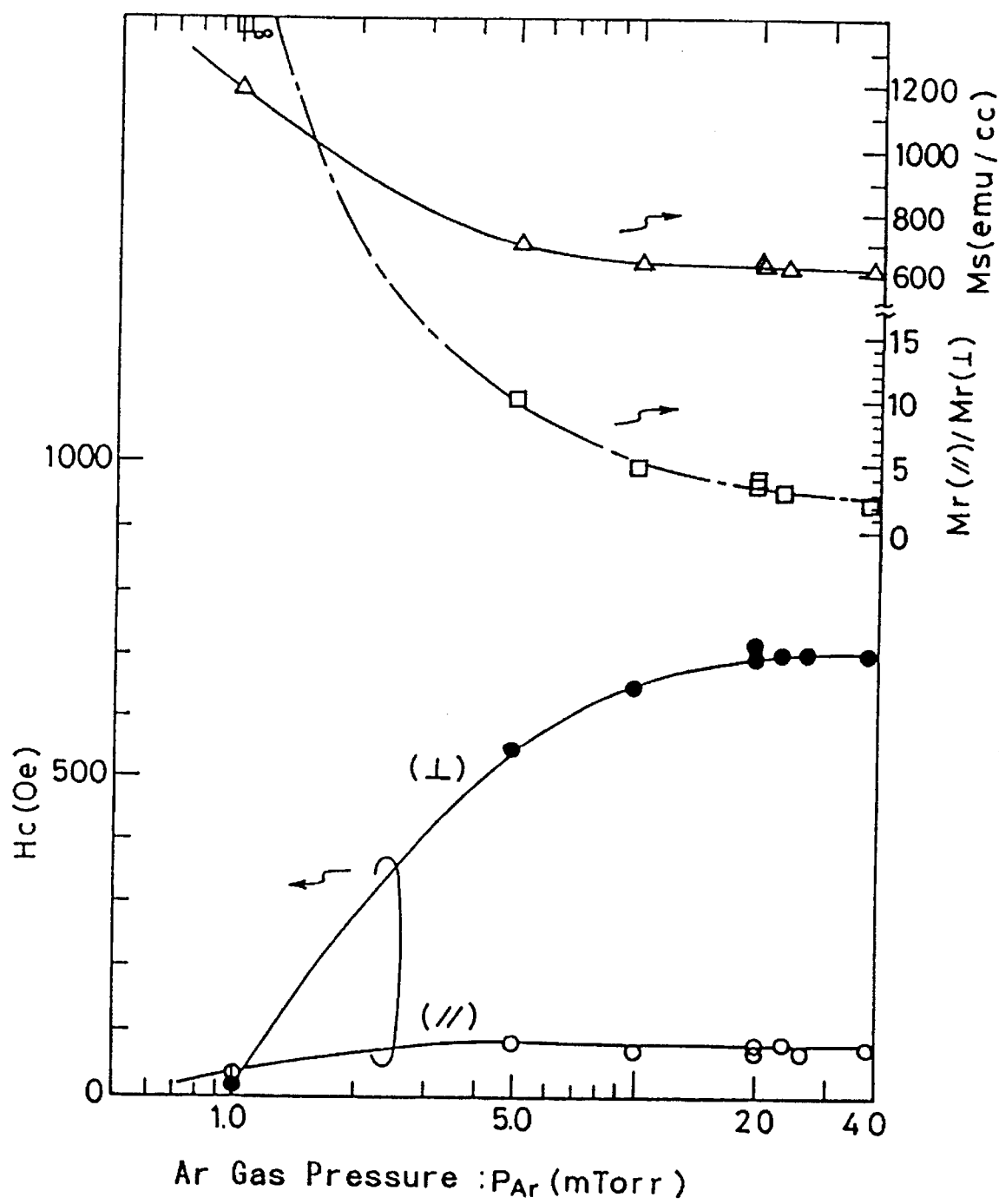
FIG. 2 is a graph showing a relation between a Ar gas pressure in the sputtering process and magnetic characteristics of the magnetic thin film of the present invention.
Figure 3:
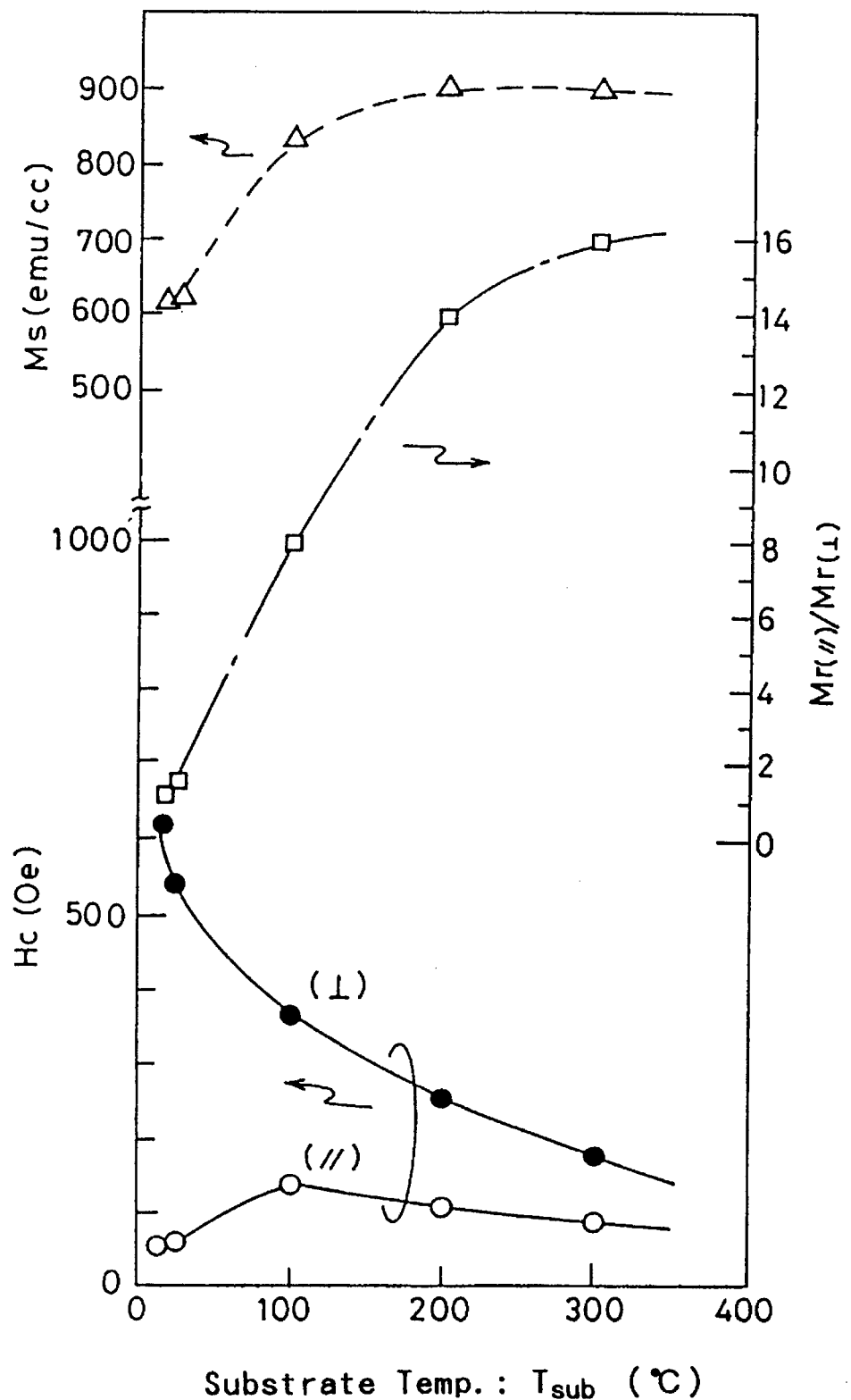
FIG. 3 is a graph showing a relation between substrate temperatures and magnetic characteristics with a thickness of the thin film 0.2 mm and Ar gas pressure 20~40 mTorr.

Description will be given to each of the three embodiments according to the present invention.

Embodiment 1

According to this embodiment 1, examples No. 1~4 were obtained by forming magnetic thin films having compositions as shown in Table 1 each having thickness of 0.2 μm on a glass plate as a non-magnetic base by the sputtering method using a compound target as a sputtering source. Quantities of Nd and B of the compositions were controlled as such that predetermined pieces of Nd chips and B chips are placed respectively on a Fe target and an alloy target. The maximum vacuum of the sputtering process was held at less than $2\times10^{-6}$ Torr and the sputtering gas pressure (Ar gas) was held at 20 mm Torr. Temperatures of the glass plates were held at the room temperature in the sputtering process. Comparative samples No. 5~11 having composition as shown in Table 1 were obtained according to the above manufacturing specifications. An another comparative example No. 12 was also obtained according to the similar manufacturing specification except that the temperature of the glass plate was held at 200° C. in the sputtering process and the target made of a Co—Cr alloy was used.

Evaluation test for corrosion resistance

TABLE 1

|  |  | Composition of magnetic thin film | Evaluation |
|---|---|---|---|
| example | No. 1 | $Nd_{10}Fe_{89}B_1$ | 4 |
|  | No. 2 | $Nd_{10}Fe_{88}B_2$ | 4 |
|  | No. 3 | $Nd_{10}Fe_{87}B_3$ | 4 |
|  | No. 4 | $Nd_{10}Fe_{86}B_4$ | 4 |
| comparative | No. 5 | $Nd_{14}Fe_{83}B_3$ | 3 |
|  | No. 6 | $Nd_{18}Fe_{79}B_3$ | 2 |
|  | No. 7 | $Nd_{22}Fe_{73}B_5$ | 2 |
|  | No. 8 | $Nd_{30}Fe_{67}B_3$ | 1 |
|  | No. 9 | $Na_{36}Fe_{59}B_5$ | 1 |
|  | No. 10 | $Nd_{36}Fe_{64}$ | 1 |
|  | No. 11 | $Nd_{10}Fe_{90}$ | 3 |
|  | No. 12 | $Co_{82}Cr_{18}$ | 4 |

Evaluation for corrosion resistance of magnetic thin films was conducted on the above Examples No. 1~4 and the comparative Examples No. 5~12 after the examples were exposed 300 hours to the following environmental conditions:

temperature; 65° C.

humidity ; 80% RH (relative humidity )

The results of the test are shown in Table 1 by using a 4-step evaluation method, i.e., 4=excellent, 3=fairly good, 2=good, 1=poor, judging from the changed values of magnetic characteristics of magnetic thin films.

As shown in Table 1, it is confirmed that the samples No. 1~4 according to the present invention show the consistent excellent results as the conventional comparative example No. 12 has.

Stiffness evaluation test

A stiffness characteristic of the perpendicular magnetic medium of the present invention was evaluated together with that of the conventional Co—Cr alloy magnetic medium. Examples of Nd—Fe—B alloy magnetic thin films were made according to the aforementioned specifications with exceptions of using flexible non-magnetic bases instead of the glass plates. The magnetic thin films of the examples had the same compositions as those of the examples and the comparative example No. 12 had as shown in Table 1. The stiffness evaluation test was conducted according to the following specifications:

(1) thickness of Nd—Fe—B alloy thin film: 0.2 μm
(thickness of C (carbon) as a protective layer provided on the magnetic thin film is 300 Å)

(2) flexible non-magnetic base:
dimensions of the specimen:
80 mm (length)×12 mm (width)
materials*;
(*PI (Polyimid), PET (Polyethyleneterephthalate), and PEN(Polyethylenenaphthalate))
PI (thickness: 75 μm),
PET (thickness; 30 μm) and
PEN (thickness; 8 μm)

(3) stiffness evaluation:
After forming a magnetic thin film of 0.2 μm thickness on each of flexible non-magnetic bases by sputtering, each of samples was formed into a loop by fixing both distal ends of the flexible non-magnetic base. A value of stiffness was obtained by measuring a pressure load (mg) to each of loops by pressing outer opposite surfaces thereof until a distance between opposite inner walls of the loop becomes 20 mm, by using a loop stiffness tester.

The results of the test were shown in Table 2.

magnetic base which was held at 200° C. on the sputtering process and the target made of a Co—Cr alloy.

The results of the evaluation test of static characteristics such as magnetic characteristics and dynamic characteristics such as electro-magnetic conversion characteristics are also shown in Table 3 of the Nd—Fe—B perpendicular magnetic medium of the present invention and the conventional Co—Cr magnetic medium having composition as shown in Table 1.

TABLE 3

| | temp. of non-mag. base | static charact. | | | | dynamic charact. | | | |
|---|---|---|---|---|---|---|---|---|---|
| | | Hc⊥ (Oe) | Hc// (Oe) | Ms (emu/cc) | Hk(eff.) (KOe) | out-put charact. | C/N (dB) | S/N (dB) | $D_{50}$ (KFCI) |
| *A | room temp. | 100 | 200 | 400 | 2.4 | — | — | — | — |
|    | 200° C. | 1010 | 280 | 510 | 4.0 | large | 51.6 | 30.5 | 78 |
| **B | room temp. | 650 | 100 | 500 | 2.1 | small | 45.0 | 37.6 | 80 |

(*A: Co—Cr thin alloy film)
(**B: crystalline Nd—Fe—B alloy thin film)

The values of the stiffness in Table 2 are mean values measured on the samples.

TABLE 2

| substrate | stiffness (mg) | | |
|---|---|---|---|
| materials (thickness) | base only | NdFeB film | CoCr film |
| PI (75 mm) | 6150 | 6700 | 9050 |
| PET (30 mm) | 1310 | 1470 | 1750 |
| PEN (8 mm) | 20 | 34 | 53 |

In Table 2, individual stiffness of three different non-magnetic base materials, i.e., PI, PET and PEN alone are shown as well as the stiffness of them on which the Nd—Fe—B alloy thin films of the present invention and the conventional Co—Cr alloy thin films are formed for comparison.

It will be understood from Table 2 that the stiffness of the non-magnetic base formed with Nd—Fe—B alloy thin film is as comparably small as the same non-magnetic base alone, and is smaller than that of the same non-magnetic base formed with Co—Cr thin film as mentioned in the foregoing, this provides an applicability of the Nd—Fe—B alloy thin film to the flexible substrates.

Evaluation test of static and dynamic characteristics of the Nd—Fe—B perpendicular magnetic medium Static and dynamic characteristics of the perpendicular magnetic medium of the present invention were evaluated together with that of the conventional Co—Cr alloy magnetic medium.

Examples of the present invention were produced according to the following manufacturing specifications:

(1) The magnetic thin films: thickness; 0.2 μm (thickness of C (carbon) as a protective layer on the magnetic thin film is 300 Å) composition; having a composition formed by using a $Nd_{9.0}Fe_{89.1}B_{1.9}$ alloy target (2) flexible non-magnetic base: material; PI temperature; room temperature (3) target: $Nd_{9.0}Fe_{89.1}B_{1.9}$ alloy (4) sputtering gas pressure; 20 mTorr The samples of the conventional Co—Cr alloy magnetic medium were also produced according to the above manufacturing conditions except the temperature of the PI non-magnetic base which was held at 200° C. on the sputtering process and the target made of a Co—Cr alloy.

As is clear from Table 3, the magnetic characteristics (Hc(⊥), Hc//, Ms, Hkeff.) of the Nd—Fe—B alloy thin film is much better than that of the Co—Cr alloy thin film when the both of thin films are formed on the non-magnetic bases of which temperatures are held at room temperature in the sputtering process.

The electro-magnetic conversion characteristics (the signal out-put characteristic and C/N ) of the the Nd—Fe—B alloy thin film seem worse than those of Co—Cr alloy thin film except S/N and $D_{50}$ (recording density)) because the Co—Cr alloy thin film has a large Hc(⊥), however, it should be noted that the characteristic values of the Co—Cr alloy thin films are ones that the Co—Cr alloy thin film is formed on the non-magnetic base of which temperature is held at 200° C. in the sputtering process.

Embodiment 2

Examples of the Nd—Fe—B alloy thin films having compositions similar to compositions shown in Table 1 were produced to confirm the effect of the heat treatment according to following specifications:

(1) The magnetic thin films: thickness; 0.2 μm (thickness of C(carbon) as a protective layer on the magnetic thin film is 300 Å) composition; having a composition formed by using a $Nd_{8.4}Fe_{89.6}B_{2.0}$ alloy target (2) non-magnetic base: materials; PI (75 μm ), glass plate temperature; room temperature (3) target $Nd_{8.4}Fe_{89.6}B_{2.0}$ alloy (4) sputtering gas pressure; 20 mTorr (5) heat treatment; time; 2 hours (constant) temperature; varied The results of the effect of the heat treatment are shown in FIG. 4.

Figure 4:
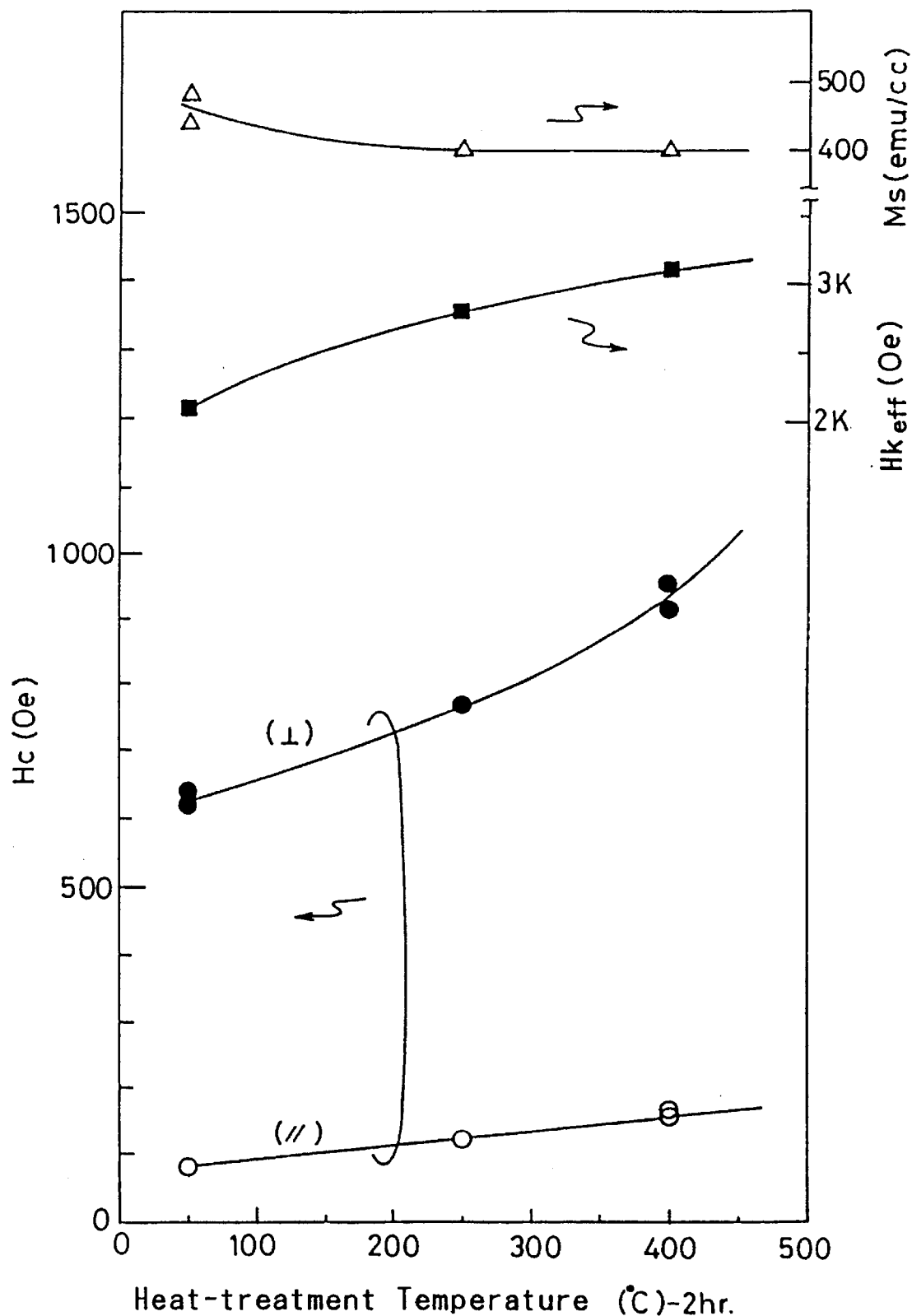
FIG. 4 is a graph showing relations between heat treatment temperatures and magnetic characteristics regarding the PI non-magnetic base.

FIG. 4 is a graph showing relations between heat treatment temperatures and magnetic characteristics of the PI non-magnetic base.

In FIG. 4, a symbol ■ indicates Hkeff. (anisotropy field ), ● Hc (⊥), and Δ Ms, respectively.

The similar results were obtained as to the glass plate and the non-magnetic plate.

As is clear from FIG. 4, the magnetic characteristics of the examples are improved as the heat treatment temperature increase. It has been confirmed by an X ray analysis that the crystal structures of the Nd—Fe—B alloy thin films never change by the heat treatment. Further, it has been confirmed that a time lapse character change of the examples does not occur after the heat treatment. Furthermore, it has also been confirmed that the dynamic characteristic of the samples is improved up to that of the conventional Co—Cr alloy recording medium of 200° C. base temperature shown in Table 3.

Embodiment 3

An example of the Nd—Fe—B alloy thin film having at least a composition similar to the compositions of embodiment 1 shown in Table 1 and other samples having additive elements to the above sample were produced to confirm the effect of the additives according to the following specifications:

(1) The magnetic thin films:
thickness; 0.2 μm (thickness of C (carbon) as a protective layer on the magnetic thin film is 300 Å) composition; having a composition formed by using a $Nd_{9.0}Fe_{89.1}B_{1.9}$ alloy target additive element: materials and quantities of the additives were controlled by changing numbers of additive chips on the $Nd_{9.0}Fe_{89.1}B_{1.9}$ alloy target.

(2) non-magnetic base: material; glass plate temperature; room temperature (3) target: $Nd_{9.0}Fe_{89.1}B_{1.9}$ alloy (4) sputtering gas pressure; 20 mTorr The results of the effect of the additives are shown in FIG. 5.

Figure 5:
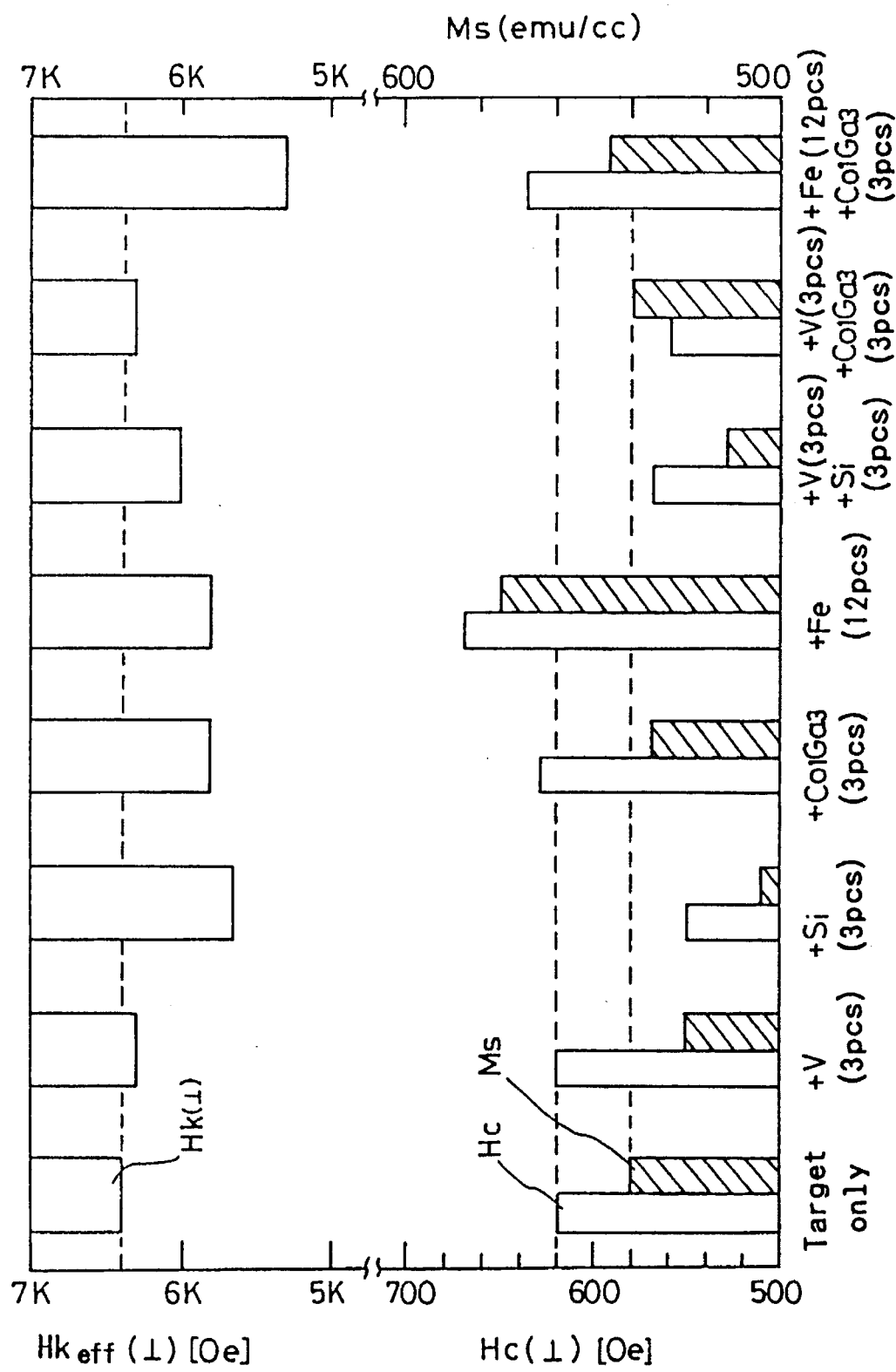
FIG. 5 is a graph showing relations between additive elements and magnetic characteristics

FIG. 5 is a graph showing relations between the additives and the magnetic characteristics As is clear form FIG. 5, examples having additives and a compound such as V, Si and $Co_1Ga_3$ show larger Hkeff.($\perp$) values than the example which has no additives or no compound. This means that the additives improve a perpendicular alignment characteristic of the Nd—Fe—B alloy thin film. Further, an example having a additive compound as $Co_1Ga_3$ shows a large Hc ($\perp$) value.

It is also confirmed that the both examples having the additives and having no additives show excellent erosion resistance characteristics.

What is claimed is:

1. A perpendicular magnetic recording medium used for a magnetic recording and reproducing apparatus comprising:

a non-magnetic base; and a magnetic thin film made of a Nd—Fe—B alloy on said non-magnetic base, said Nd—Fe—B alloy comprising 2 to less than 13 atom % Nd, above zero to no more than 4 atom % B and the remainder being Fe, and with said Nd—Fe—B alloy having a crystalline structure of α-Fe with a diffraction peak at the crystal face (110) which is detectable by X-ray analysis.

2. A perpendicular magnetic recording medium as claimed in claim 1, wherein said boron component lies between 1 and 4 atom %.

3. A perpendicular magnetic recording medium as claimed in claim 1, wherein said Nd—Fe—B alloy composition has a coercive force range of 600–1,000 ($\perp$) Oe.

4. A manufacturing method for manufacturing a magnetic thin film on a non-magnetic base as defined in claim 1 by a sputtering method, wherein a sputtering gas pressure is determined to be within a range of about 20 to about 40 mTorr, and a sputtering temperature of said non-magnetic base is determined to be less than 100° C.

5. A manufacturing method for manufacturing a magnetic thin film on a non-magnetic base as defined in claim 2 by a sputtering method, wherein a sputtering gas pressure is determined to be within a range of about 20 to about 40 mTorr, and a sputtering temperature of said non-magnetic base is determined to be less than 100° C.

* * * * *